United States Patent Office 3,146,383
Patented Aug. 25, 1964

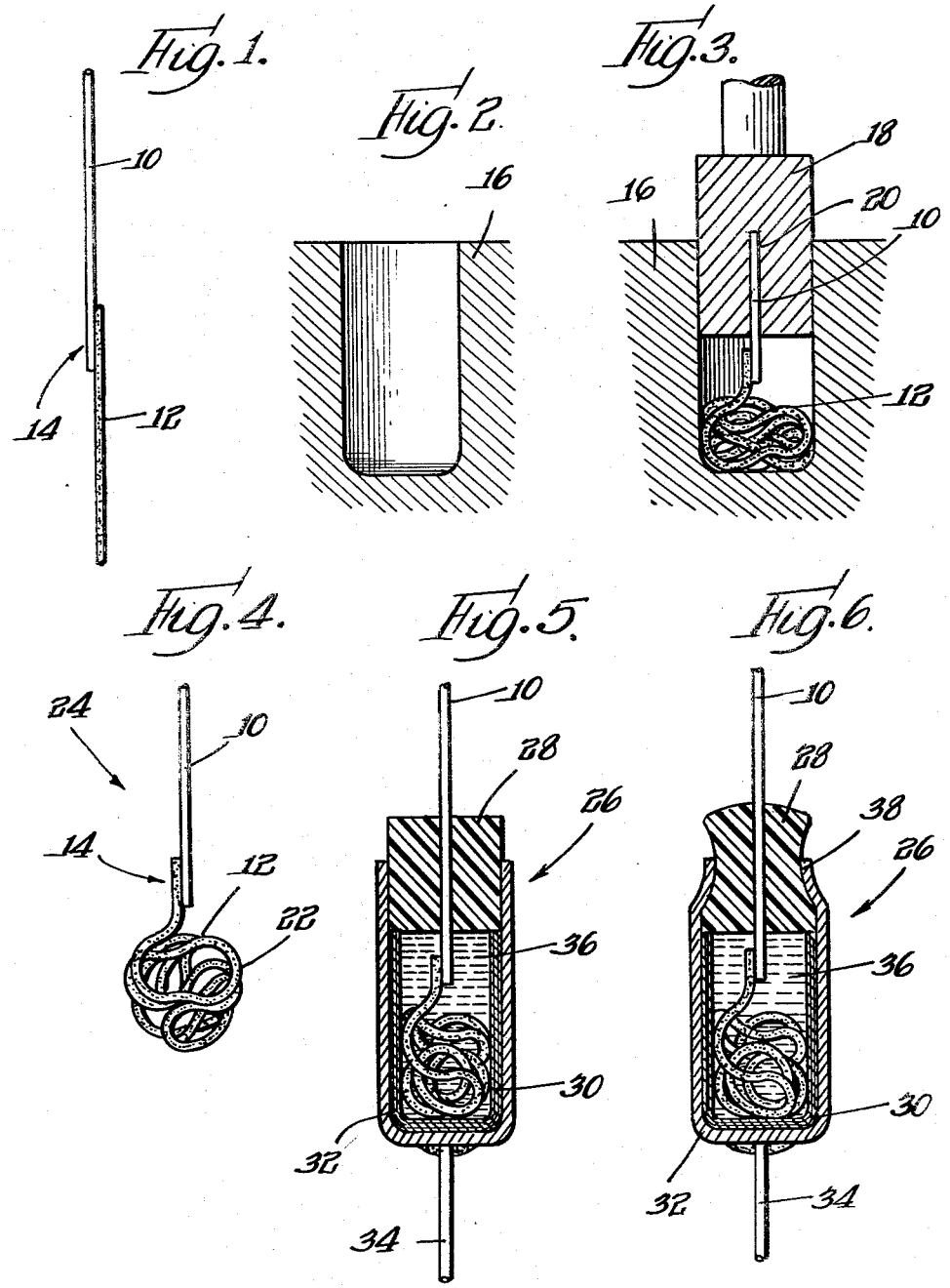

3,146,383
CAPACITOR UNIT AND ELECTRODE THEREFOR
Jean W. Runtz, Morton Grove, and Kenneth E. Johnson, Park Ridge, Ill., assignors to Ohmite Manufacturing Company, Skokie, Ill., a corporation of Illinois
Filed Apr. 6, 1959, Ser. No. 804,194
7 Claims. (Cl. 317—230)

This invention relates generally to electrodes for small electrical units and more particularly to a tantalum anode which is especially useful in capacitors.

The use of tantalum anodes in capacitor units is well known. Commonly, such anodes are provided in the form of a coil of wire, a ball or slug, or shaped foil. The wire coil and the shaped foil are space consuming, and capacitors fashioned from such elements are unnecessarily bulky. On the other hand, while an anode in the form of a ball or slug is compact, a ball or slug consumes considerable amounts of the anode material. An expensive finished product results thereby.

A general object of the present invention, therefore, is to provide an improved electrode for small electrical units.

Another object of the invention is to provide a tantalum electrode which is compact and economical to manufacture.

Yet another object of the invention is to provide a capacitor which includes an improved tantalum anode.

A further object of the invention is to provide a tantalum anode which can be made to conform readily to a variety of shapes.

Still further objects and features of the invention pertain to the particular structure and arrangements whereby the above objects are attained.

The invention, both to its structure and mode of operation, will be better understood by reference to the following disclosure and drawings forming a part thereof, wherein:

FIG. 1 is an enlarged, fragmentary, elevational view of a tantalum wire structure which may be used as the starting material in fabricating an anode according to the present invention;

FIG. 2 is an enlarged, fragmentary, central vertical cross sectional view of a forming die which may be used in fashioning the anode of the invention;

FIG. 3 is an enlarged, fragmentary, central vertical cross sectional view showing a plunger cooperating with the forming die in fashioning the anode of the invention;

FIG. 4 is an enlarged, side view of the formed anode according to the invention;

FIG. 5 is an enlarged, fragmentary, central vertical cross sectional view showing an intermediate stage in the fabrication of a capacitor unit incorporating the anode of FIG. 4; and FIG. 6 is a view similar to FIG. 5 illustrating a subsequent stage of fabrication.

One important use of the anode of the present invention is in the art of tantalum capacitors; and hereinafter, such art will be used for purposes of explanation and illustration, without intending to limit the applications and uses of the invention thereby.

In fashioning an anode for a tantalum capacitor, it is desirable to start by welding or otherwise intimately connecting a straight piece of unetched tantalum wire 10 to a piece of etched tantalum wire 12. Appropriately, such a connection or weldment 14 is made joining wire 10 end-to-end with wire 12. While it is possible to start with a single straight section of tantalum wire, it is advantageous to start with an unetched wire joined to an etched wire. In this manner, a smooth terminal is provided to maximize the efficiency of the seal in the finished capacitor. Simultaneously, an etched member is provided implementing a comparatively high capacitance rating.

According to an important feature of the invention, a major portion of the etched wire 12 is jumbled or configurated randomly in correspondence with the internal contour of the cathode casing into which it will be subsequently inserted. FIG. 4 shows the wire 12 so jumbled. In obtaining such a configuration, there may be employed a forming die 16 adapted to receive a plunger 18. Appropriately, plunger 18 is provided with a recess or blind bore 20 which is arranged to receive wire 10. After the wire 10 has been inserted into the recess 20, jumbling of wire 12 may be achieved by propelling plunger 18 into the cavity of die 16.

After having been configurated, the unit composed of wire 10 and wire 12 may be subjected to an anodic oxidizing treatment by any suitable method so as to form or deposit thereon a layer 22 of tantalum oxide. Layer 22 is preferably thin in order to implement its functioning as the dielectric medium in the capacitor unit.

Once the anode, shown generally at 24, is prepared, as described hereinabove, it may be assembled into a capacitor unit 26 as follows. A plug or bushing 28 is slipped over the free end of wire 10. Plug or bushing 28 may be fabricated from polytetrafluoroethylene resin, i.e., "Teflon," or any other suitable, inert, insulating material. Subsequent to the assembly of bushing 28, the jumbled wire 12 may be wrapped in one or several layers of thin paper 30. Advantageously, this paper is possessed of interconnecting pores but is non-absorbent of the electrolyte which is to be added, as will be described hereinbelow. If desired, the layers of paper 30 may be preformed into a cup-shaped member.

The sub-assembly described immediately hereinabove may next be inserted into a tubular, cup-shaped cathode case or housing 32 which has a lead wire 34 suitably connected to its closed end. Conveniently, cathode case 32 may be formed from silver whereas the lead wire 34 may be formed from nickel.

Since bushing 28 is of a size and shape to fit the open end of the cathode case 32 closely but not necessarily tightly, a quantity of liquid electrolyte 36 may be easily vacuum-filled into the casing 32. Water solutions of lithium chloride and lithium bromide are suitable liquid electrolytes, as is well known in the art.

Although the present embodiment is adapted to utilize liquid electrolyte, it is recognized that a solid electrolyte may be equally as well employed. Such a solid electrolyte may be provided by applying magnesium dioxide to the anode 24, subsequently coating the unit with graphite, spraying the unit with copper, inserting the unit into a cathode case lined with solder and finally heating the unit in order to liquefy the solder.

Once the electrolyte has been filled, the lip 38 of cathode housing 32 may be spun down or crimped around the bushing 28 in order to provide a seal. A tight closure, as implemented by the smoothness of wire 10 and the resistance of the Teflon of bushing 28 to plastic deformation, is thus effected.

Additional operations, such as capping of the unit or aging, may be performed as deemed necessary.

From the foregoing descriptions, the general function of the anode 24 and the capacitor unit 26 will be readily understood.

While a particular embodiment of the invention has been described, it will be understood, of course, that the invention is not to be limited thereto since many modifications may be made; and it is, therefore, contemplated to cover by the appended claims any such modifications as fall within the true spirit and scope of the invention.

The invention is claimed as follows:

1. An electrode for small electrical units comprising: a straight unetched wire; a straight etched wire terminating in a shaped jumble, being welded at its straight end to one end of said unetched wire; and a dielectric coating applied over said wires.

2. An electrode for small electrical units comprising: a straight unetched tantalum wire; a straight etched tantalum wire terminating in a shaped jumble, being welded at its straight end to one end of said unetched wire; and a dielectric coating of tantalum oxide applied over said wires.

3. An electrode for small electrical units comprising: a straight unetched tantalum wire; a straight etched tantalum wire terminating in a cylindrical-shaped jumble, being welded at its straight end to one end of said unetched wire; and a dielectric coating of tantalum oxide applied over said wires.

4. A capacitor unit comprising: a cathode having an open end and a closed end; a wire anode including a first portion extending axially and centrally within said cathode and a second portion defining a shaped jumble conforming to the internal contour of said cathode and the closed end thereof, said anode being coated with a dielectric material; a closure member seated in the open end of said cathode embracing the projecting end part of said first wire portion; and an electrolyte contained within said cathode.

5. A capacitor unit comprising: a tubular metallic cathode having an open end and a closed end; a tantalum wire anode including a first portion extending axially and centrally within said cathode and a second portion defining a shaped jumble conforming to the internal contour of said cathode and the closed end thereof, said anode being coated with tantalum oxide; a closure member seated in the open end of said cathode embracing the projecting end part of said first wire portion; and an electrolyte contained within said cathode.

6. A capacitor unit comprising: a tubular metallic cathode having an open end and a closed end; a tantalum wire anode including a first portion extending axially and centrally within said cathode and a second portion defining a shaped jumble conforming to the internal contour of said cathode and the closed end thereof, said anode being coated with tantalum oxide; a substantially cup-shaped member of porous, non-absorptive paper disposed between said cathode and said anode; a closure member seated in the open end of said cathode embracing the projecting end part of said first wire portion; and an electrolyte contained within said cathode.

7. A capacitor unit comprising: a tubular metallic cathode having an open end and a closed end; a tantalum wire anode including a first portion extending axially and centrally within said cathode and a second portion defining a shaped jumble conforming to the internal contour of said cathode and the closed end thereof, said anode being coated with tantalum oxide; a substantially cup-shaped member of porous, non-absorptive paper disposed between said cathode and said second portion of said anode; a closure member seated in the open end of said cathode embracing the projecting end part of said first wire portion; and a liquid electrolyte contained within said cathode.

References Cited in the file of this patent

UNITED STATES PATENTS

| | | |
|---|---|---|
| 1,447,657 | Gauin | Mar. 6, 1923 |
| 2,277,687 | Brennan | Mar. 31, 1942 |
| 2,846,624 | Hilton | Aug. 5, 1958 |
| 2,900,579 | Rogers | Aug. 18, 1959 |

FOREIGN PATENTS

| | | |
|---|---|---|
| 13,644 | Great Britain | of 1896 |
| 379,348 | France | Nov. 5, 1907 |
| 624,434 | Germany | Dec. 2, 1935 |